US012113363B2

(12) United States Patent
Gupta et al.

(10) Patent No.: US 12,113,363 B2
(45) Date of Patent: Oct. 8, 2024

(54) CONTROL OF A RENEWABLE ENERGY POWER PLANT TO RESUME NORMAL OPERATION FOLLOWING A FAULT

(71) Applicant: VESTAS WIND SYSTEMS A/S, Aarhus N (DK)

(72) Inventors: Manoj Gupta, Jaipur (IN); Kouroush Nayebi, Ikast (DK); Janakiraman Sivasankaran, Singapore (SG)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 680 days.

(21) Appl. No.: 17/417,060

(22) PCT Filed: Nov. 28, 2019

(86) PCT No.: PCT/DK2019/050370
§ 371 (c)(1),
(2) Date: Jun. 21, 2021

(87) PCT Pub. No.: WO2020/125881
PCT Pub. Date: Jun. 25, 2020

(65) Prior Publication Data
US 2022/0060020 A1    Feb. 24, 2022

(30) Foreign Application Priority Data
Dec. 20, 2018  (DK) .......................... PA 2018 70845

(51) Int. Cl.
*H02J 3/18*  (2006.01)
*G05B 15/02*  (2006.01)
(Continued)

(52) U.S. Cl.
CPC ................ *H02J 3/18* (2013.01); *G05B 15/02* (2013.01); *H02J 3/004* (2020.01); *H02J 3/381* (2013.01);
(Continued)

(58) Field of Classification Search
None
See application file for complete search history.

(56) References Cited

U.S. PATENT DOCUMENTS 9,059,604 B2 *  6/2015  Johnson .................... H02J 3/50
9,513,614 B2 * 12/2016  Schnetzka ............. F03D 7/0272
(Continued)

FOREIGN PATENT DOCUMENTS

AU    2009231274 A1 *  9/2010  ............. F03D 11/02
CN     201887484 U  *  6/2011  ............. H02J 3/001
(Continued)

OTHER PUBLICATIONS

Elyaalaoui et al., "Dispatching and control of active and reactive power for a wind Farm considering fault ride-through with a proposed PI reactive power control", Mar. 2019, Renewable Energy Focus, vol. 28. (Year: 2019).*

(Continued)

*Primary Examiner* — Mohammad Ali
*Assistant Examiner* — Kelvin Booker
(74) *Attorney, Agent, or Firm* — Patterson + Sheridan, LLP

(57) ABSTRACT

There is provided a method for operating a renewable energy power plant comprising a plurality of renewable energy generators, the method comprising: calculating a rate of change of reactive power reference level for transitioning between a present reactive power reference level, output by a reactive power controller, and a target reactive power reference level, the target reference level being suitable for normal operation of the renewable energy power plant; and, following a fault on a power network to which the renewable energy power plant is connected, dispatching a control signal for controlling the renewable energy power plant to generate or consume reactive power at the calculated rate of (Continued)

change to transition the reactive power level of the renewable energy power plant to the target reactive power reference level.

13 Claims, 10 Drawing Sheets

(51) Int. Cl.
  *H02J 3/00* (2006.01)
  *H02J 3/38* (2006.01)
  *H02J 13/00* (2006.01)
(52) U.S. Cl.
  CPC ..... *H02J 13/00002* (2020.01); *H02J 2300/22* (2020.01); *H02J 2300/28* (2020.01)

(56) References Cited

U.S. PATENT DOCUMENTS

| | | | | |
|---|---|---|---|---|
| 9,634,673 | B2* | 4/2017 | Dong | H03L 7/08 |
| 9,711,964 | B2* | 7/2017 | Achilles | H02J 3/50 |
| 2011/0178646 | A1* | 7/2011 | Haj-Maharsi | H02J 3/1885 |
| | | | | 700/287 |
| 2012/0035774 | A1 | 2/2012 | Yasugi | |
| 2012/0326511 | A1* | 12/2012 | Johnson | H02S 10/00 |
| | | | | 307/52 |
| 2013/0079945 | A1 | 3/2013 | Achilles et al. | |
| 2013/0106196 | A1 | 5/2013 | Johnson et al. | |
| 2014/0021720 | A1 | 1/2014 | Nelson et al. | |
| 2015/0322921 | A1 | 11/2015 | Li et al. | |
| 2015/0326168 | A1* | 11/2015 | Johnson | H02S 50/10 |
| | | | | 700/287 |
| 2015/0365014 | A1* | 12/2015 | Lin | H02M 1/44 |
| | | | | 363/40 |
| 2017/0025855 | A1 | 1/2017 | Garcia | |
| 2017/0314534 | A1 | 11/2017 | Gupta et al. | |
| 2020/0280771 | A1* | 9/2020 | Hoang | G01D 4/002 |

FOREIGN PATENT DOCUMENTS

| | | | | |
|---|---|---|---|---|
| CN | 104362669 A * | 2/2015 | | H02J 3/36 |
| CN | 104483532 A * | 4/2015 | | H02J 3/36 |
| CN | 106611965 A * | 5/2017 | | H02J 3/16 |
| CN | 111030157 A * | 4/2020 | | H02J 3/36 |
| CN | 115360694 A * | 11/2022 | | H02J 3/001 |
| EP | 2573894 A2 * | 3/2013 | | H02J 3/1892 |
| EP | 2738904 A2 | 6/2014 | | |
| WO | WO-2010057250 A1 * | 5/2010 | | H02J 3/383 |
| WO | WO-2013063224 A1 * | 5/2013 | | H02J 1/00 |
| WO | 2020125881 A1 | 6/2020 | | |
| WO | WO-2023213368 A1 * | 11/2023 | | F03D 7/0284 |

OTHER PUBLICATIONS

Buccafusca et al., "An Application of Nested Control Synthesis for Wind Farms", 2019, IFAC PapersOnLine 52-20 (2019) 199-204. (Year: 2019).*
Danish Patent and Trademark Office 1st Technical Examination for Application No. PA 201870845 dated Sep. 10, 2019.
PCT Notification of Transmittal of the International Search Report and the Written Opinion of the International Searching Authority, or the Declaration for Application No. PCT/DK2019/050370 dated Feb. 18, 2020.

* cited by examiner

CONTROL OF A RENEWABLE ENERGY POWER PLANT TO RESUME NORMAL OPERATION FOLLOWING A FAULT

TECHNICAL FIELD

The present invention relates to a method of controlling a renewable energy power plant, to a renewable energy power plant controller, and to a wind turbine power plant more generally.

BACKGROUND

Newly commissioned renewable power plants, and more particularly wind power plants, are expected to be able to operate and adapt to a number of different circumstances when connected to a power network. A wind power plant (WPP) typically comprises a plurality of wind turbine generators and is also known as a wind park or a wind farm. The regulation and general operation of the power plant is controlled by a power plant control system or controller (PPC), which implements operational limits and requirements as set out by a Transmission System Operator (TSO) or in country-specific grid interconnection requirements or 'grid codes'. The TSO also communicates power delivery demands to the PPC.

Grid codes commonly include specific requirements for reactive and/or active current supply by each power plant during a fault, such as a voltage deviation, experienced by the network. These requirements ensure that the network is fully supported throughout the fault and that recovery of the voltage level is sustained by the active and/or reactive current supplied by the wind power plant or plants.

Following a fault, power plant controllers are expected by the TSO to quickly return operation of the power plant to normal conditions experienced prior to the fault. In some circumstances, network conditions are unsatisfactory and conventional resumption of control causes more instability in the power network. This is particularly the case in 'weak' connections between a power network and a power plant, where changes in active or reactive power supplied to the network by the plant cause unwanted voltage fluctuations.

It is an aim of the present invention to improve upon conventional solutions.

SUMMARY OF THE INVENTION

According to an aspect of the present invention there is provided a method for operating a renewable energy power plant comprising a plurality of renewable energy generators. The method comprises: calculating a rate of change of reactive power reference level for transitioning between a present reactive power reference level, output by a reactive power controller, and a target reactive power reference level, the target reference level being suitable for normal operation of the power plant; and, following a fault on a power network to which the renewable energy power plant is connected, dispatching a control signal for controlling the power plant to generate or consume reactive power at the calculated rate of change to transition the reactive power response of the power plant to the target reactive power reference level.

By calculating the rate of change of reactive power, or reactive power 'ramp rate', the conditions of the power plant, connecting network, and wider power network are taken into account when returning to normal operation. By tailoring the ramp rate to dynamically react to present conditions, the possibility of instability in the power network caused by operation of the power plant is reduced.

The fault may be a voltage deviation. The fault may be caused by a voltage deviation. The voltage deviation may be an under-voltage event.

The method may comprise generating a difference between the present reactive power reference level and the target reactive power reference level. The rate of change of reactive power reference level may be calculated based on the generated difference.

The rate of change of reactive power reference level may be indirectly proportional to the generated difference. In other words, a large generated difference results in a small rate of change of reactive power reference level, while a small generated difference results in a large rate of change of reactive power reference level. Therefore, large transitions are implemented slowly and small transitions are implemented quickly, ensuring that stability of the grid is maintained by not transitioning the reactive power level too quickly.

The method may comprise determining the target reactive power reference level. The target reactive power reference level may be a reactive power reference level generated based on normal operational conditions of the power plant. The target reactive power reference level may be a reactive power reference level generated prior to the fault. The target reactive power reference level may be a reactive power reference level generated most recently prior to the fault. Implementing a target reactive power reference level based on a prior level permits resumption of operation as if the fault had not occurred.

The target reactive power reference level may be a reactive power reference level generated during the fault as if the fault had not occurred. In other words, the reference level may be calculated as if the power plant had been operating in a normal operational mode during the time that the fault was happening. By basing the target reactive power reference level on a level generated during the fault as if the fault had not occurred, the normal operation of the plant can be resumed as quickly as possible Determining the target reactive power reference level may comprise operating two reactive power controllers to output reactive power reference levels. A first of the two reactive power controllers may be configured to operate in a fault ride-through mode during a grid fault. A second of the two reactive power controllers may be configured to operate in a normal operational mode during a grid fault. The target reactive power reference level may be the output of the second reactive power controller. Advantageously, this arrangement makes use of existing componentry within the wind turbine, so does not require additional modification of the plant to implement the method. The use of a second reactive power controller requires no adaptation of the first reactive power controller.

The rate of change of reactive power reference level for transition may be calculated based, at least in part, on a short-circuit ratio of the power network. The short-circuit ratio is beneficially used as it may be used to assess the state of the power network and its stability, and thus how fast the transition can be. The rate of change of reactive power reference level for transition may be calculated based, at least in part, the weakness of the power network. The short-circuit ratio may be used to calculate weakness of the power network. A longer transition time may be used for a weak grid than for a strong grid.

The rate of change of reactive power reference level for transition may be calculated based, at least in part, on a voltage level.

According to another aspect of the invention, there is provided a power plant controller for controlling operation of a renewable energy power plant comprising a plurality of renewable energy generators and connected to a power network, the power plant controller comprising: a main reactive power controller configured to generate a reactive power reference level; and a dynamic ramp rate controller configured to calculate a rate of change of reactive power reference level for transitioning between the reactive power reference level output by the main reactive power controller and a target reactive power reference level, the target reference level being suitable for normal operation of the power plant.

The dynamic ramp rate controller may comprise an additional reactive power controller configured to generate the target reactive power reference level. During a fault, the main reactive power controller and additional reactive power controller may be configured to operate in different modes. During the fault, the main reactive power controller operates in a fault ride-through mode and the additional reactive power controller operates in a normal operating mode.

The dynamic ramp rate controller may comprise ramp rate logic configured to calculate the rate of change of reactive power reference level for transition based, at least in part, on a difference between the main and target reactive power reference levels.

According to another aspect of the invention, there is provided a controller configured to control a renewable energy power plant according to a method as described above.

The renewable energy power plant may be a wind power plant. The renewable energy generators may be wind turbine generators.

The renewable energy power plant may be a solar power plant. The renewable energy generators may be solar power generators.

According to another aspect of the invention, there is provided a computer program downloadable from a communication network and/or stored on a machine readable medium, comprising program code instructions for implementing a method as described above.

According to another aspect of the invention, there is provided a renewable energy power plant comprising the controller as described above.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying drawings, in which.

DETAILED DESCRIPTION

Figure 1:
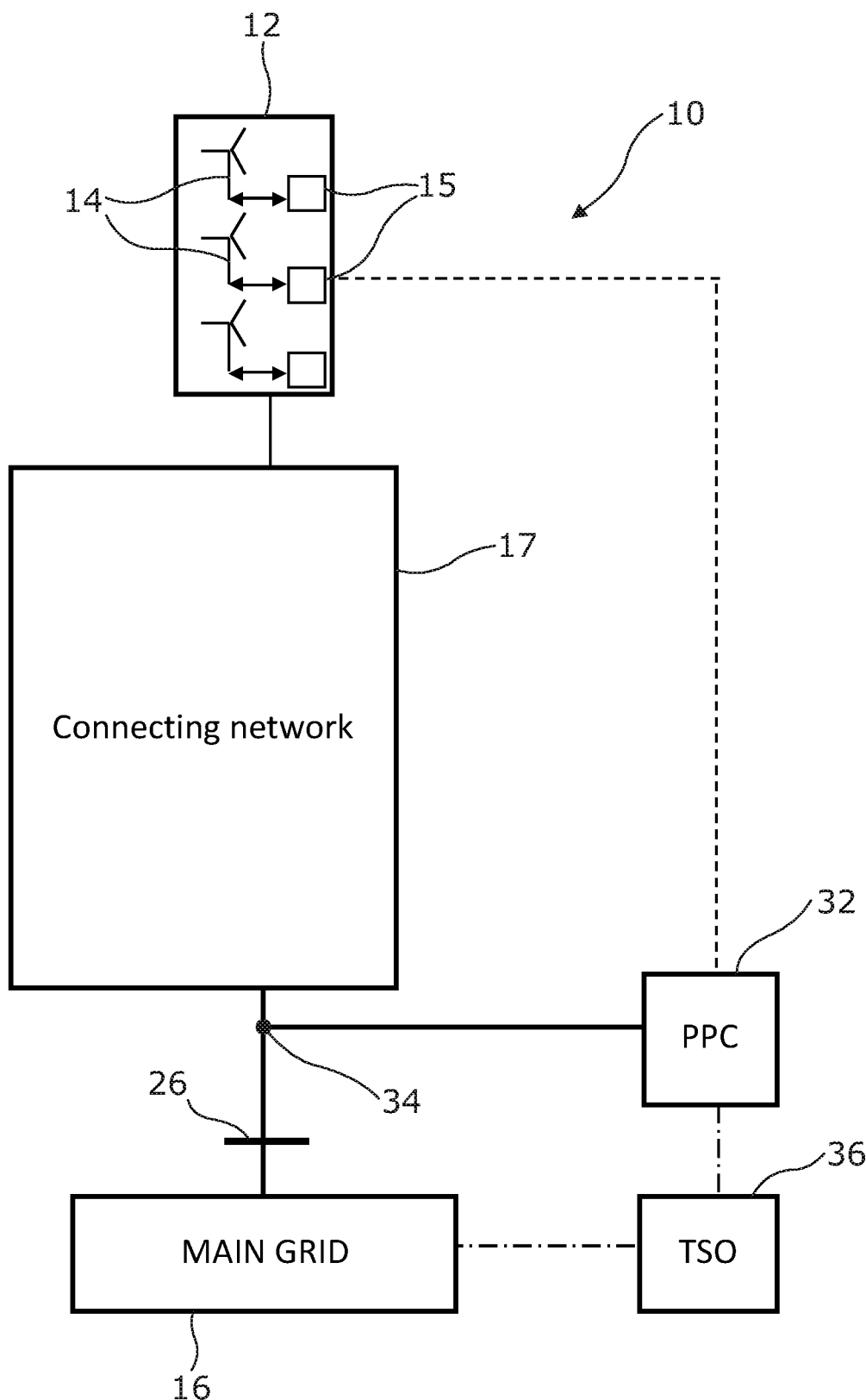
FIG. 1 is a schematic architecture of a power network including a wind power plant and a main grid.

FIG. 1 illustrates a typical architecture in which a wind power plant (WPP) is connected to a main transmission grid as part of a wider power network. The diagram of FIG. 1 should only be taken as a representation of a power network. Alternative configurations of power network and power plants are known and it is expected that other known components may be incorporated in addition to or as alternatives to the components shown and described in FIG. 1. Such changes would be within the capabilities of the skilled person. For example, substations or extra transformers would be expected to be incorporated in the WPP depending upon the number of WTGs included in the plurality of WTGs.

As will be understood by the skilled reader, a WPP comprises at least one wind turbine generator (WTG), more typically called simply a 'wind turbine'. WPPs are also known as wind parks or wind farms. The examples shown are representative only and the skilled reader will appreciate that other specific architectures are possible, in relation to both wind power plants, power plants for other renewable energy sources, wind turbine generators and other renewable energy generating sources. Thus, this disclosure relates to renewable energy power plants and renewable energy generators in general, rather than being specific to wind power plants and generators as in the Figures. In addition, the skilled reader will appreciate that methods, systems and techniques also described below may be applicable to many different configurations of power network. Moreover, the components of the wind power plant and power network are conventional and as such would be familiar to the skilled reader. It is expected that other known components may be incorporated in addition to or as alternatives to the components shown and described in the Figures. Such changes would be within the capabilities of the skilled person. In particular, it will be appreciated that the WPP may also be considered to comprise STATCOM equipment, substation equipment, cables, plant controllers, and other componentry required to connect the WPP to a main grid.

Furthermore, the skilled reader will understand that FIG. 1 is a schematic view, so the way in which the control commands are transferred is not depicted explicitly. The interconnections may be direct or 'point to point' connections, or may be part of a local area network (LAN) operated under a suitable protocol (CAN-bus or Ethernet for example). Also, it should be appreciated that rather than using cabling, the control commands may be transmitted wirelessly over a suitable wireless network, for example operating under WiFIT or ZigBee™ standards (IEEE802.11 and 802.15.4 respectively).

FIG. 1 shows a power network 10 incorporating a WPP 12. The WPP 12 includes a plurality of WTGs 14. Each of the plurality of WTGs 14 converts wind energy into electrical energy, which is transferred from the WTGs 14 to a main transmission network or main grid 16, as active current, for distribution. A connecting network 17 extends between the WPP 12 and the main grid 16.

WTGs 14 generate both active power and reactive power. The main grid 16 often has specific active and reactive power level requirements with which the WPP 12 is required to comply, and the output of the WTGs 14 can be changed to match these requirements in real time. Other grid requirements may be specified for reactive and active current levels and for voltage levels at specific points within the power network.

The output of each WTG 14 is controlled using an associated WTG controller 15. During normal operation of the WPP 12, the WTG controllers 15 operate to implement active and reactive power reference levels set by a power plant controller (PPC) 32. During extraordinary conditions, the WTG controllers 15 operate to fulfil predetermined network requirements, and also act to protect the WTGs 14 from any potentially harmful conditions. During these extraordinary conditions, the WTG controllers may operate the WTGs 14 to be autonomous, separate from the PPC 32. Together, the PPC 32 and WPP 12 operate according to methods and processes described herein in order to safely and stably regain a normal operational state and a normal operational reactive power level output to the main grid 16 following operation in a fault mode.

Each of the WTGs 14 of the WPP 12 is connected to a local grid (not shown) that links the WTGs 14. The WPP 12 is connected to the main grid 16 by a connecting network. The WPP 12 and the main grid 16 are connected at a Point of Interconnection (PoI) 68, which is an interface between the WPP 12 and the main grid 16.

Connecting networks are known in the art and comprise a combination of transmission lines, buses and/or transformers to couple the WPP to the main grid. Other components such as circuit breakers, reclosers, and other systems known in the art may also be incorporated into the connecting network.

Returning to control of the WTGs, the PPC 32 is connected to the power network 10 at a Point of Measurement (POM) 34 and is also connected directly to the WPP 12. The PPC 32 is a suitable computer system for carrying out the controls and commands as described above, and is equipped to measure a variety of parameters. As the PoM 34 is not at the PoI 26, the measured parameters are only representative as losses in the lines between the PoM 34 and PoI 26, and between the PoM 34 and the PPC 32, may have an effect on the measurements. Suitable compensation may take place to account for the losses to ensure that the measurements are accurate.

The role of the PPC 32 is to act as a command and control interface between the WPP 12 and a grid operator or transmission system operator (TSO) 36. The TSO 36 is responsible for indicating the needs and requirements of the main grid 16 to the PPC 32. The PPC 32 monitors parameters of the power output such as a frequency and voltage, as well as reactive current or power exchange between the WPP 12 and the main grid 16 and other parameters, such as voltage level, of the main grid 16. In its role as command and control interface, the PPC 32 interprets the power delivery demands requested of it by the TSO 36 and manages the WTGs 14 in the WPP 12 in order to satisfy those requirements, whilst taking into account other operative factors such as the monitored parameters, as well as sudden changes in output or measured grid voltage, and/or, as will be elaborated on in the following description, grid faults. The WTGs 14 are capable of altering their current or power output in reaction to commands received from the PPC 32.

As will be understood by the skilled person, a grid fault, or grid fault event, is generally defined as a period in which the voltage level of the grid 16 or wider power network drops to a level outside the accepted and normal operational voltage bounds.

During a grid fault in which grid voltage levels drop below predefined thresholds (a so-called 'under-voltage' event), the WPP 12 and PPC 32 operate in an under-voltage mode, such as a low-voltage ride through (LVRT) mode. The WPP 12 is operated in the under-voltage mode to avoid disconnection of the WPP 12 from the grid 16 and to support the grid 16 through the fault. In the LVRT mode, the WPP 12 supports the grid 16 during the fault by supplying reactive current to encourage a rise in voltage levels. The WPP 12 is required to supply reactive current until the voltage levels have returned to levels that are within a normal operating voltage band. In many circumstances, this operating band is between voltage levels of 0.9 per-unit (p.u.) voltage and 1.1 p.u. voltage.

As would be understood by the skilled person, per-unit voltage is an expression of the voltage with respect to a base value which is used as a reference. Similarly, per-unit active current, or per-unit reactive current is an expression of the power/current with respect to a reference base value. Using a per-unit system allows for normalization of values across transformers and other components that may change the value by an order of magnitude.

The WPP 12 is operated to comply with a set of grid requirements specific to the main grid 16. When operating in an under-voltage mode, the WTGs 14 of the WPP 12 initially act autonomously and are controlled by WTG controllers 15. Put another way, the WTGs 14 are not being controlled according to the signals output from the PPC 32 during at least part of the under-voltage mode In the under-voltage mode, the WTGs 14 operate to control active and reactive current according to pre-defined criteria. This is contrary to normal operational modes, in which the WTGs are substantially continuously controlled according to control signals dispatched by the PPC 32.

During the fault, when the WTGs 14 are acting autonomously, the PPC 32 enters fault ride-through mode. The first phase of the fault ride-through mode is a fault state in which the control loops of the PPC 32 are effectively frozen. In other words, while the WTGs 14 are not receiving commands based on the output of the PPC 32, the output of the PPC 32 is fixed at a pre-set level in preparation for exiting the fault state. Typically, this pre-set level is the unity power factor, where the reactive power reference output is set to 0 p.u.

The fault state is maintained until a trigger condition is met. Once the trigger condition is met, the WPP 12 and PPC 32 enter a post-fault state. The trigger condition is typically that voltage levels have reached a pre-determined threshold value, referred to as $V_{LVRT\_OUT}$, although other trigger conditions may be specified.

In the post-fault state, the PPC 32 outputs reactive power reference levels to control the WTGs 14 to support the recovery of voltage levels. The WTGs 14 are controlled in a voltage control mode according to the reactive power reference levels.

The post-fault state ends once voltage levels recover to normal levels (i.e. to between 0.9 and 1.1. p.u.) because the supply of high reactive power levels is no longer necessary. Following the post-fault state, the WTGs 14 and PPC 32 are configured to return to the operational mode they were operating in prior to the fault. Reactive power reference levels output by the PPC 32 are generated according to the normal operational mode. As the post-fault state requires high reactive power supply, the difference between the reactive power reference levels of the post-fault state and the normal operational mode may be very large or very small, depending on which mode is the normal operational mode.

However, an instant or near-instant change from post-fault state reactive power reference levels to normal operational mode reactive power reference levels is inadvisable because it may lead to instability of voltage levels of the grid. Where the normal operational mode of the PPC 32 is a reactive power or power factor control mode, the change in the reference level required to return to the normal operational mode may be large.

This is a particular issue in so-called 'weak grid interconnections'. An interconnection between a remote power plant and a power network may, under certain situations, be described as being a 'weak grid interconnection' because small changes in reactive/active power exchange between the plant and the network may result in large voltage oscillations. Weak grid interconnections occur when the grid 16 is operating at or close to its design limits, and so has a low fault level. Weak grid interconnections are most frequent in remotely located facilities where insufficient infrastructure is provided, resulting in a high likelihood that the design limit will be reached.

The transition between post-fault state and normal operational mode can be improved by one approach, in which a transition state is implemented between post-fault and normal state. In the transition state, there is a transition between the different reactive power reference levels. This is a form of 'bumpless transfer'. Using this approach, in the transition state, the reactive power reference level specified by the PPC 32 is altered according to a rate of change or 'ramp rate' determined prior to first use of the WPP 12 or PPC 32. The pre-determined ramp rate is designed to conform with the grid code requirements of the main grid. For example, the grid code may specify a particular time period within which the transition must be completed, thereby providing a minimum ramp rate for the transition period. The PPC 32 implements the ramp rate using a series of step changes to the reactive power reference levels it provides to the WTGs 14. Using a pre-determined ramp rate advantageously permits the controlled transition between the post-fault and normal operational states, and reduces the likelihood of instability in the grid. The skilled person will appreciate that the ramp rate may be implemented in any conventional way.

Figure 2:
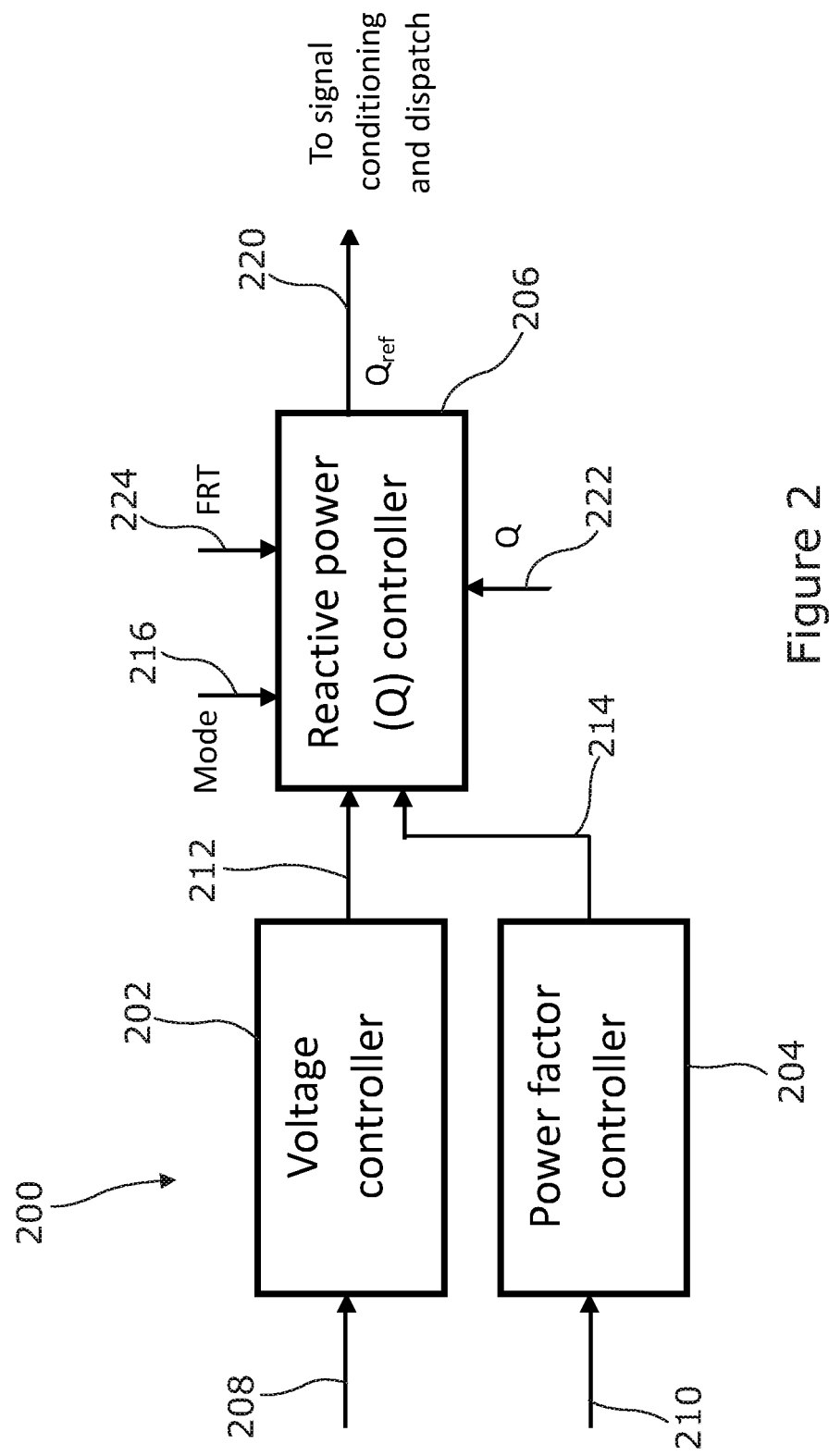
FIG. 2 is a schematic representation of a control architecture for use in a power plant controller.
Figure 3:
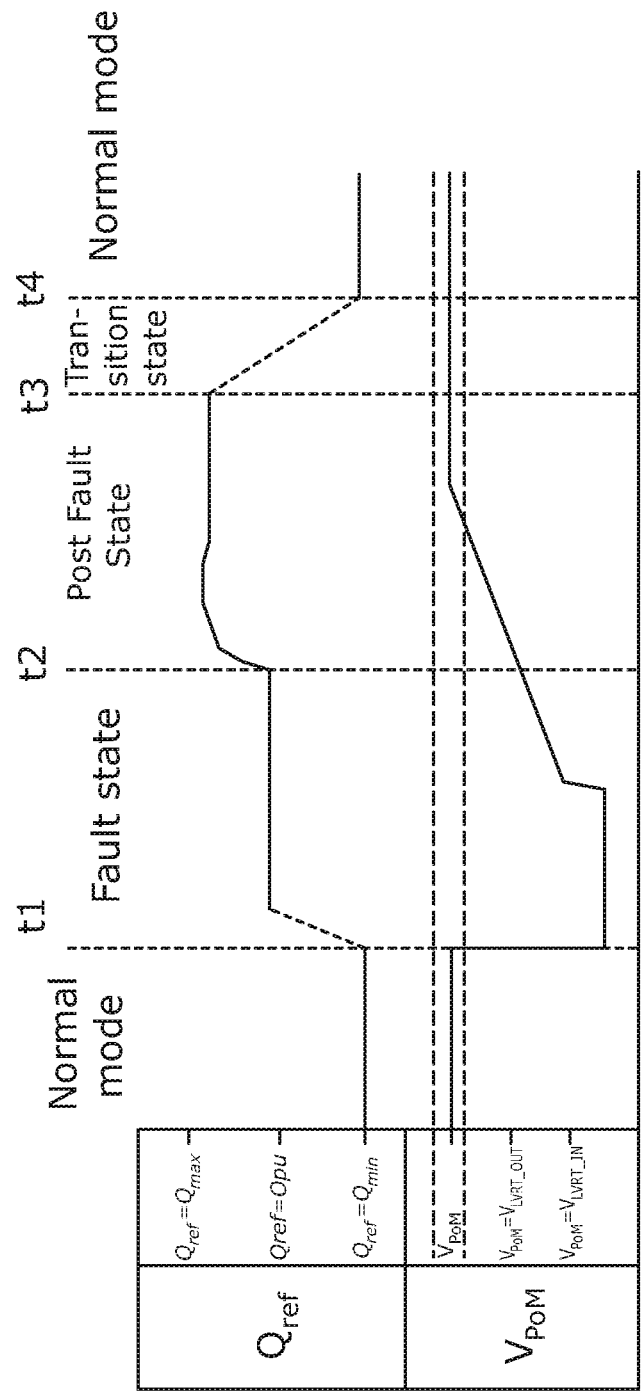
FIG. 3 is a representation demonstrating voltage levels in an example fault scenario and the response of the power plant controller of FIG. 2.

The PPC 32 implements a pre-determined ramp rate using a control architecture 200 such as that shown in FIG. 2. FIG. 3 illustrates a fault scenario and the reaction of the PPC 32 incorporating the architecture 200 of FIG. 2 to the voltage changes experienced during the fault.

The architecture 200 of FIG. 2 comprises a voltage controller 202, a power factor controller 204, and a reactive power controller 206, also called a Q controller. The voltage controller 202 is sometimes referred to as a voltage slope controller. The voltage controller 202 and power factor controller 204 each receive one or more inputs 208, 210, and each generates an output 212, 214 based on the received inputs 208, 210. Each output 212, 214 is a reactive power set point. For example, the inputs 208, 210 may include one or more indications of a mode of operation, power factor or voltage set points, and/or measured and/or calculated parameters associated with the connecting network or main grid. The parameters may include the measured voltage at the PoI or PoM, and/or measured active power at the PoI or PoM.

The reactive power set point outputs 212, 214 generated by the voltage and power factor controllers 202, 204 are for use by the Q controller 206 in determining the reactive power reference levels that should be communicated to the WPP 12. The output 212 of the voltage controller 202 is used by the Q controller 206 when the normal mode of operation of the PPC 32 and the WPP 12 is a voltage control mode. The power factor controller output 214 is used by the Q controller 206 when the normal mode of operation of the PPC 32 and the WPP 12 is a power factor control mode. To select which of the controller outputs 212, 214 to use, the Q controller 206 receives an input 216 indicating the operational mode. In some instances, the Q controller 206 incorporates a switching mechanism to receive inputs from one of the voltage or power factor controllers 202, 204 only.

As will be understood by the skilled person, a WPP operated in voltage control mode is controlled to maintain a voltage level, a WPP operated in power factor control mode is controlled to maintain a power factor, and a WPP operated in a reactive power control mode is controlled to consume or supply a reactive power level.

In addition to the input 212, 214 received from one of the voltage controller 202 or power factor controller 204, the Q controller 206 receives further inputs, and based on these inputs generates a reactive power reference level output, $Q_{ref}$ 220. Signal conditioning is performed on the reactive power reference level output 220 before dispatch to the WPP 12, where WTGs 14 are controlled so that the reactive power reference level is met.

In the architecture 200 of FIG. 2, the Q controller 206 receives additional inputs comprising measured reactive power level, Q, 222 at the PoM, PoI, and/or output by the WPP/WTGs, and a fault ride-through (FRT) input 224.

It will be appreciated that in other configurations, other inputs, such as reactive power (Q) set points according to the grid code or stored relationships, may be received at the Q controller 206. In other configurations, certain inputs may be combined. For example, the mode of operation input 216 and fault ride-through input 224 may be combined.

The fault ride-through input 224 causes the Q controller 206 to enter the fault state when a voltage deviation or other fault occurs on the main grid 16. As discussed above, in the fault state, the reactive power reference level of the Q controller 206 is frozen at a predetermined set point, while the WTGs 14 act as autonomous current sources. Control of the WTGs 14 by the PPC 32 is resumed in the post-fault state once a trigger condition is met.

FIG. 3 shows the response of the output 220 of the Q controller 206 to a voltage deviation, when the normal operational mode of the PPC 32 is a power factor mode. FIG. 3 provides two charts: a voltage scenario for voltage levels measured at the PoM on the lower chart; and the concurrent operation of the reactive power reference level ($Q_{ref}$) in response to the voltage on the upper chart.

Initially, voltage measured at the PoM 34 is within the normal operational bounds, denoted in FIG. 3 by the parallel dashed lines either side of the 1 p.u. voltage level. As the PPC 32 is operating in the power factor mode, the Q controller 206 receives inputs from the power factor controller 204. The Q controller 206 bases its output 220 on the signals received from the power factor controller 204. The input from the voltage controller 202 is not used in this mode. The reactive power reference level when the voltage levels are within normal operational bounds is therefore the minimum reactive power level, $Q_{min}$. A reactive power level of $Q_{min}$ indicates that the WPP 12 is being instructed to consume reactive power.

In this scenario, a fault occurs at time t1. The voltage level deviates from its normal operational levels. As a result, the Q controller 206 receives a signal from the fault ride-through input that a fault has occurred, and the Q controller 206 enters its fault state. The reactive power reference level moves from $Q_{min}$ to the unitary power factor, 0 p.u. The Q controller 206 maintains its reference output at 0 p.u. when in the fault state.

At time t2, the trigger condition is met to move from the fault state to the post-fault state. In this scenario, the trigger condition that has been met is that the voltage level has recovered to a pre-determined level. In the scenario depicted, the pre-determined level is the voltage level at which the fault event is deemed to have been completed, here labelled $V_{LVRT\_OUT}$. When $V_{LVRT\_OUT}$ is achieved, outputs and operations that have been effectively 'frozen' are 'un-frozen' to allow operations to continue. The PPC 32 enters the post-fault state and resumes its communication with the WPP 12 for control according to the reference levels output by the Q controller 206. In the post-fault state, voltage recovery is supported further by the Q controller 206 by specifying a reactive power reference level that is or is close to supplying the maximum reactive power, $Q_{max}$, to the grid.

During the post fault state, the voltage levels are expected to recover to within their normal operational levels. Once it is determined that the recovery is complete, that voltage levels are within their normal operational bounds, and that the fault has been cleared, the Q controller 206 switches to a transition state. In FIG. 3, the transition state begins at time t3.

In the transition state, the reactive power reference levels output by the Q controller 206 for control of the WPP 12 are changed from the post-fault state reference level to a normal operational mode reference level. The normal reference level may be the same as the reference level immediately prior to the fault, or it may be different and based on the new conditions. The change is implemented using the pre-determined rate of change. The rate of change may be implemented by step changes in reactive power reference level at pre-determined time intervals.

Once the reactive power reference level of the normal operational mode is regained, normal operation of the PPC 32 and hence the WPP 12 is resumed. This takes place in FIG. 3 at time t4.

In an alternative approach, an alternative control architecture may be incorporated into the PPC 32 of the system of FIG. 1 in order to facilitate the dynamic calculation of ramp rate for transition between post-fault state and normal operation. In other words, the alternative architecture permits the real-time calculation of the ramp rate according to the instantaneous conditions of the grid, WPP, or connecting network, or according to other criteria.

Figure 4:
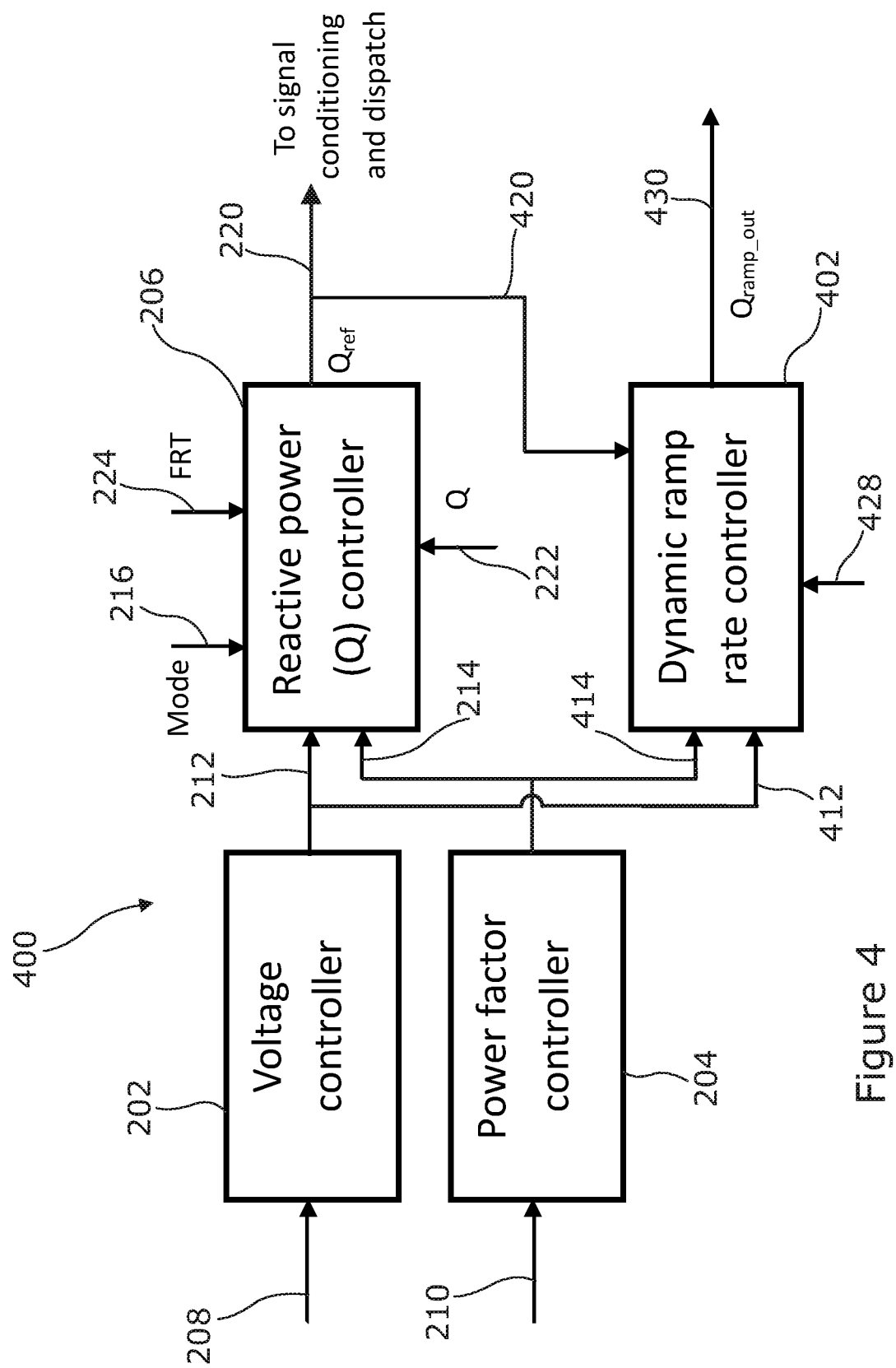
FIG. 4 is a schematic representation of an alternative control architecture for use in a power plant controller.
Figure 6:
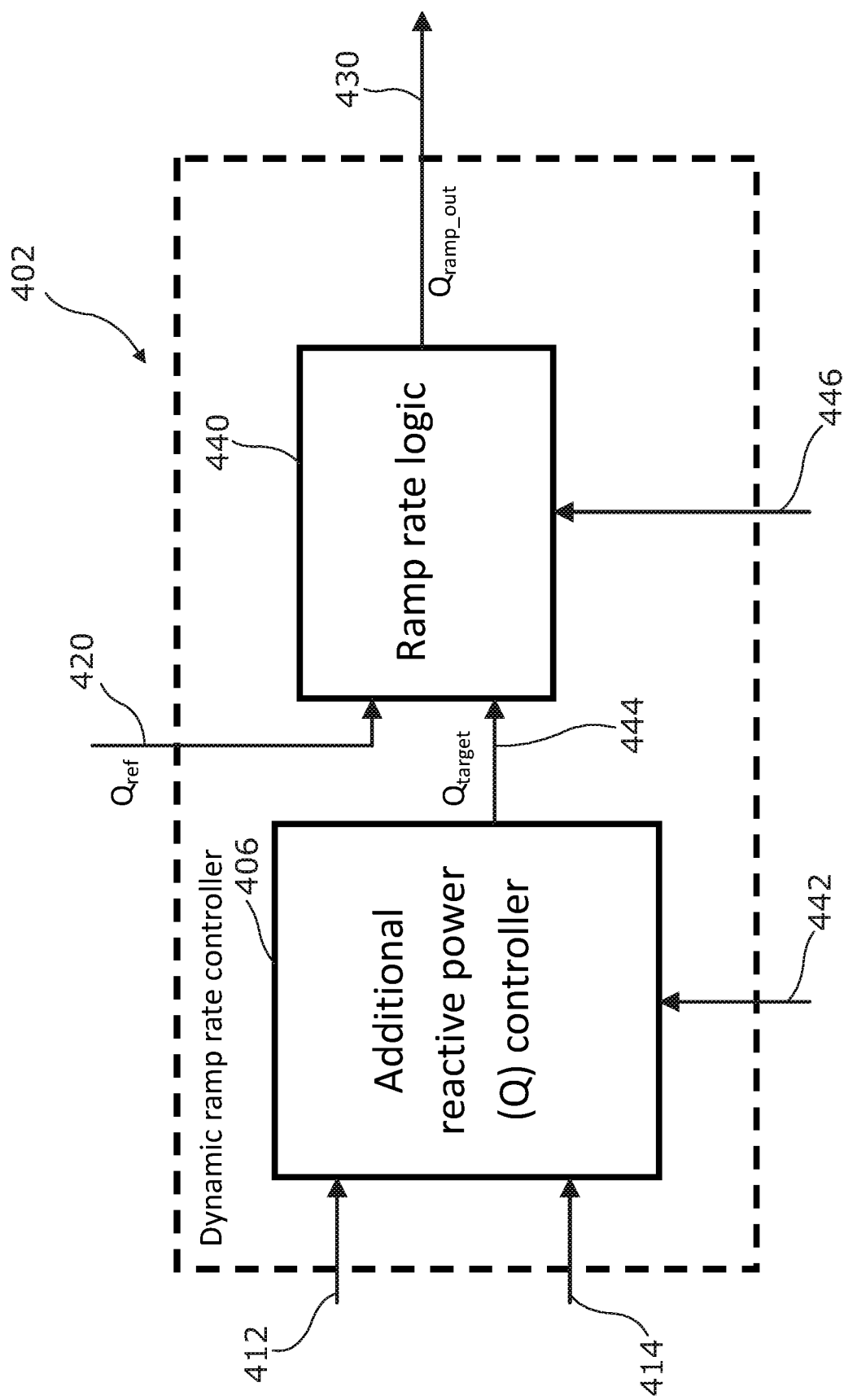
FIG. 6 is a schematic representation of an example dynamic ramp rate controller for use in the power plant controller of FIG. 4.
Figure 7:
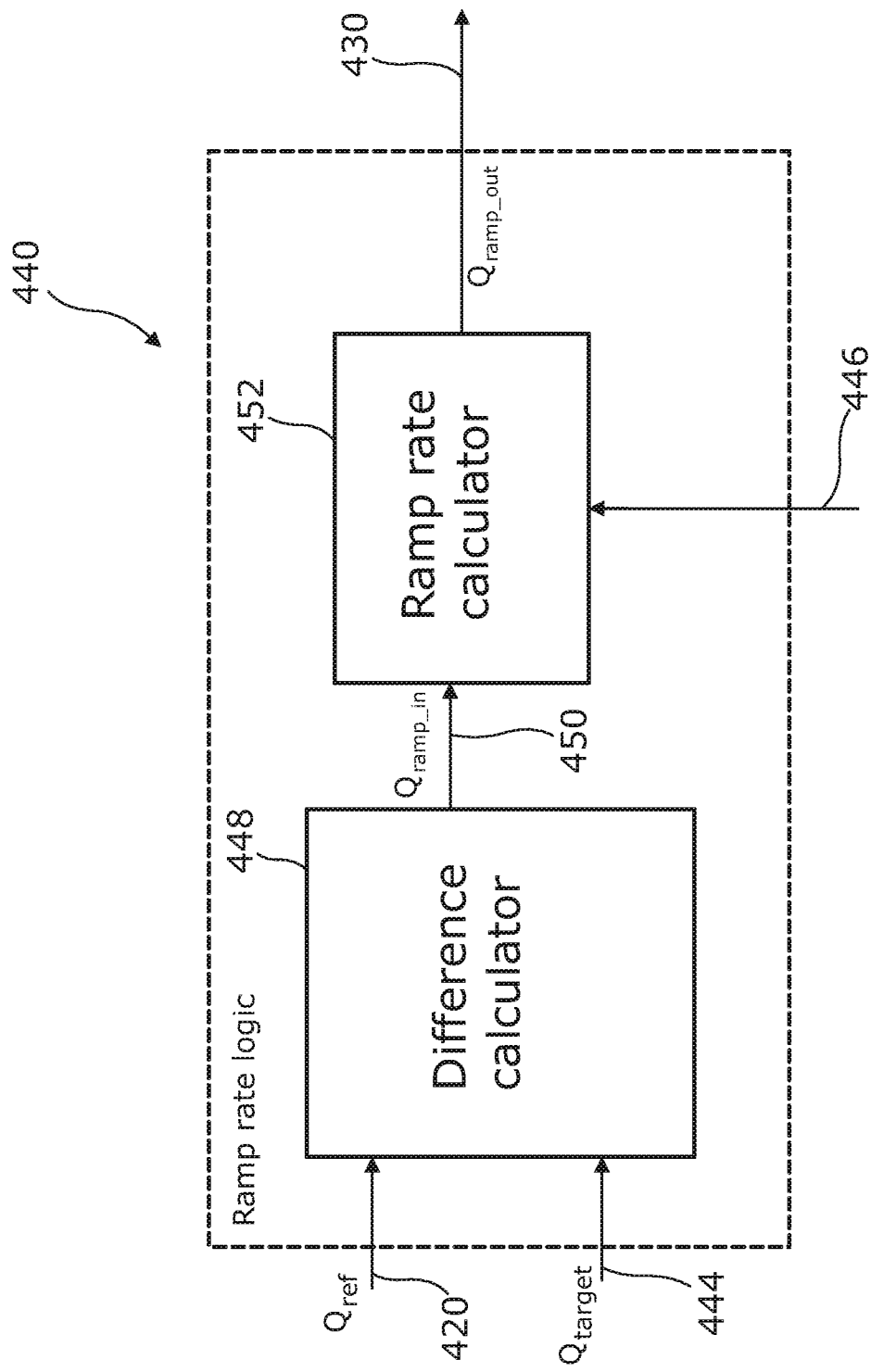
FIG. 7 is a schematic representation of example ramp rate logic for use in the dynamic ramp rate controller of FIG. 6.

An alternative architecture is depicted in FIG. 4, and example features of the alternative architecture are provided in FIGS. 6 and 7. Specifically, FIG. 4 illustrates the overall alternative architecture 400, which includes the components of the architecture 200 of FIG. 2. The components shared by the architectures of FIGS. 2 and 4 perform the same functions as described above. Therefore, the shared components are given the same reference numerals as used in FIG. 2, and will not be described further.

In addition to the components of FIG. 2, the alternative architecture 400 of FIG. 4 includes a dynamic ramp rate controller 402. The dynamic ramp rate controller 402 is arranged to receive input signals 412, 414, 420 from the voltage controller 202, power factor controller 204, and the Q controller 206. The dynamic ramp rate controller 402 is also configured to receive external inputs 428.

The inclusion of the dynamic ramp rate controller 402 permits the dynamic control of the rate of change of reactive power reference level during the transition state. This is achieved by dispatching an output ramp rate ($Q_{ramp\_out}$) 430. The dynamic control of rate of change of reactive power reference level is a particularly effective mechanism for reducing the likelihood of voltage instability. Reducing a ramp rate to a minimum level is useful in weak grid interconnections, where fast transitions result in unwanted fluctuations. Conversely, the adaptation of ramp rate is also useful in stronger grid interconnections, permitting an increase in ramp rate where possible. It is common for the strength of grid interconnections to vary during operation due to changes in conditions and parameters, and so the ability of the system to adapt to new circumstances is also beneficial. A further advantage is that where changes in requirements for WPPs are necessary, these changes do not require reprogramming of the entire system, but instead can be implemented using the ramp rate controller.

In FIG. 4, the dynamic ramp rate controller 402 is shown as being arranged in parallel to the Q controller 206, although it will be appreciated that these systems may be arranged in series, or may be entirely separate systems. The inputs provided to the dynamic ramp rate controller may also be varied depending upon the requirements of the operator.

Figure 5:
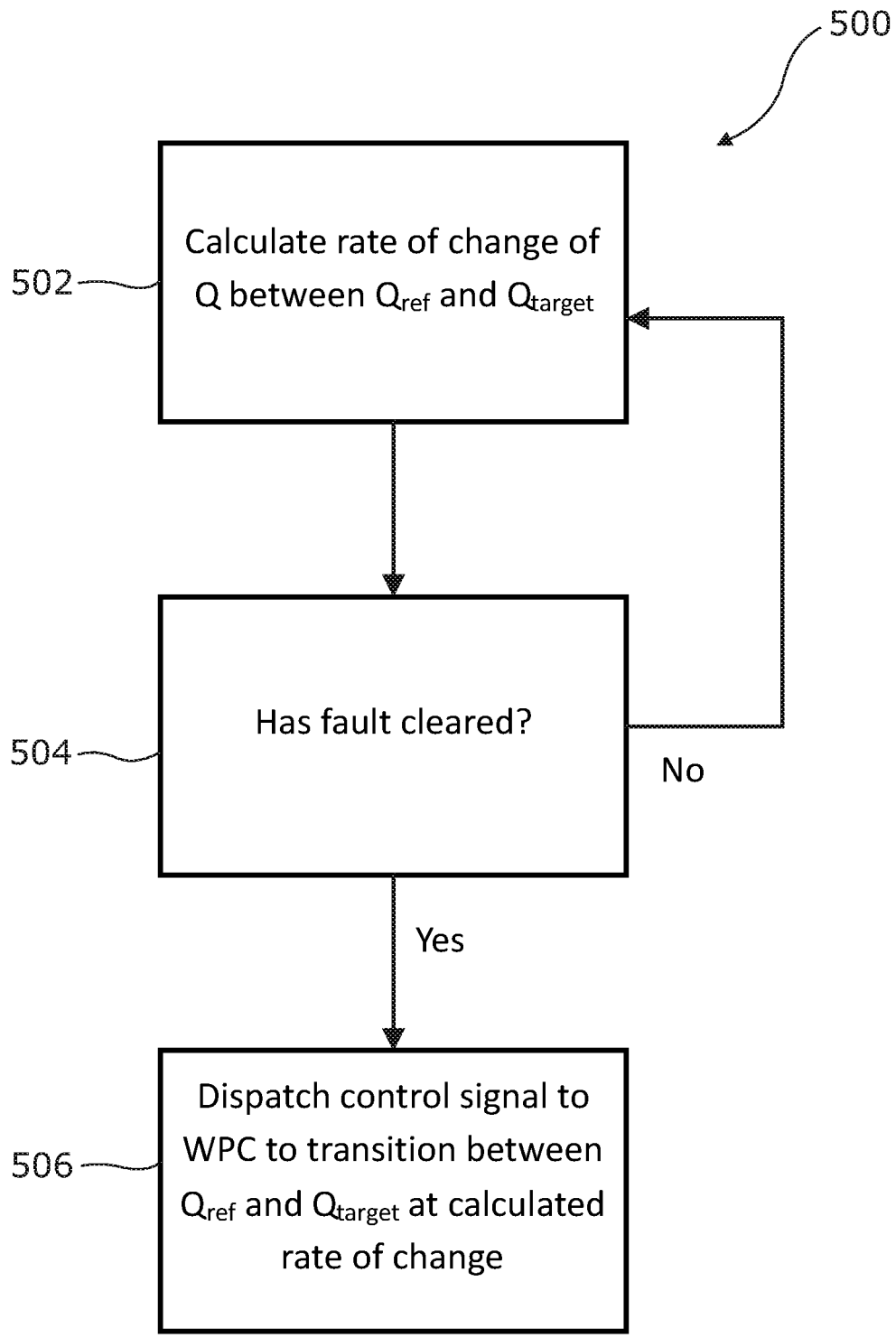
FIG. 5 is a method of operating a wind power plant.

The architecture 400 of FIG. 4 operates according to a method 500 depicted by FIG. 5. In the method 500, a rate of change of reactive power reference level, i.e. a ramp rate, is calculated 502. The ramp rate is calculated as being suitable for transitioning between the reactive power reference level ($Q_{ref}$) being output by the Q controller and a target reactive power reference level ($Q_{target}$) which is suitable for the normal operation of the power plant. Following a fault, the calculated ramp rate is then utilised to dispatch 506 a control signal to control the power plant and its generators to generate or consume reactive power at the ramp rate so that the transition between the reactive power reference level and the target reactive power reference level is achieved. It is envisaged that the ramp rate is calculated based at least on the magnitude of the difference between the target and main reactive power reference levels. In some examples, the ramp rate may be indirectly proportional to the difference. The ramp rate may also be based in part on other inputs, as will be discussed later.

An example dynamic ramp rate controller 402 that may be used to implement the method of FIG. 5 is shown in detail in FIG. 6. The dynamic ramp rate controller 402 comprises an additional Q controller 406 and ramp rate calculation logic 440. For distinction, the Q controller 206 shared by the architectures 200, 400 of FIGS. 2 and 4 will be referred to as the main Q controller hereinafter.

The additional Q controller 406 receives inputs 412 from the voltage controller and power factor controller 414 and may also receive other inputs 442, such as a measured reactive power level and/or mode input. However, importantly, the additional Q controller 406 and main Q controller 206 are distinguished by the fault ride-through input 224; the main Q controller 206 receives input 224 relating to fault ride-through, while the additional Q controller 406 does not. As the additional Q controller 406 does not receive a fault ride-through input, it does not enter a fault ride-through mode. Instead, the additional Q controller 406 continues to output reactive power reference levels according to the normal operational mode at the same time that the main Q controller is in the fault and post-fault states. In this system, the output 444 of the additional Q controller 406 becomes the target reactive power reference level, $Q_{target}$, for transition to during the transition state.

The output 420, 444 from both the main Q controller 206 and the additional Q controller 406 are input to the ramp rate calculation logic 440, which calculates the dynamic ramp rate accordingly. The ramp rate logic 440 may receive further inputs 446 indicating the state of the power network, and any limiting features or circumstances that may influence the maximum or minimum ramp rates or that may dictate how the ramp rate is calculated.

FIG. 7 illustrates example ramp rate calculation logic 440. The logic 440 comprises a difference calculator 448, configured to calculate the absolute difference between the reactive power reference level, $Q_{ref}$, provided by the main Q controller 206 and the target reactive power reference level, $Q_{target}$, provided by the additional Q controller 406. The output 450 of the difference calculator 448, $Q_{ramp\_in}$, is communicated to a ramp rate calculator 452, which, using any limiting inputs 446, is configured to calculate the ramp rate, $Q_{ramp\_out}$, and to communicate it as an output 430. The ramp rate may be calculated according to look-up tables, a pre-determined formula, or according to modelling, for example.

The calculated ramp rate is utilised by a further controller to control the actual reactive power control of the WTG.

Example inputs 446 to the ramp rate calculator 452 are short-circuit ratio (SCR) and voltage measured at the PoM. Change of voltage level and/or phase angle may also be used. The SCR is used to assess whether a weak grid interconnection exists. The SCR can be calculated in real-time by measuring the voltage level change for a given reactive power change at a bus and is given as the ratio of this reactive power change to the voltage level change. These values are typically sampled over a short sampling window. SCR is typically compared to a pre-set threshold value. If the SCR falls below the threshold, a weak grid interconnection is identified and limits may be applied to the ramp rate accordingly.

In some embodiments, the threshold SCR value for identifying a weak grid interconnection is 3.0. In other embodiments, the threshold value is less than 3.0. For example, the threshold may be a value between 3.0 and 2.5. In exceptional circumstances, the threshold value may be lower than 2.5.

Figure 8:
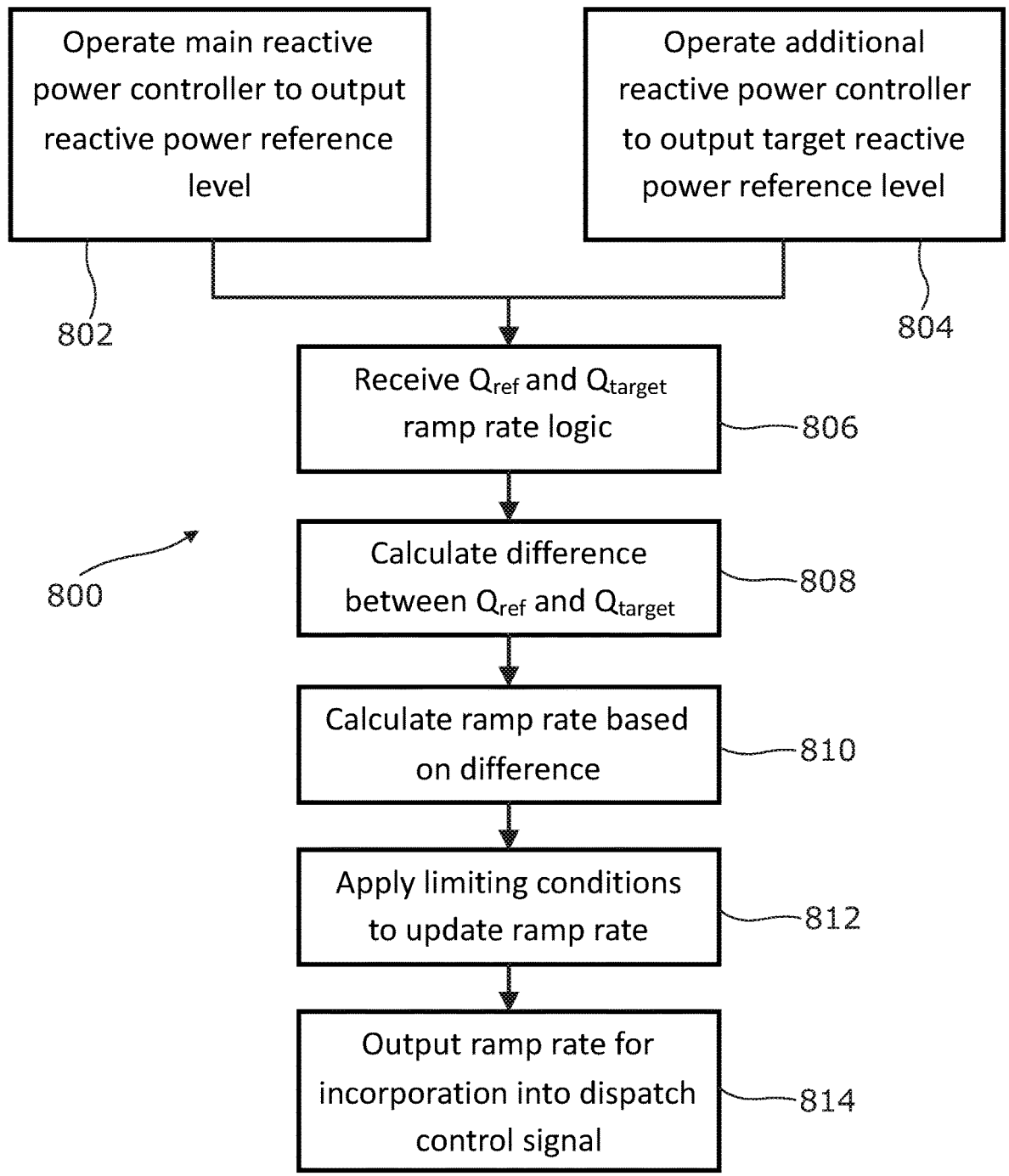
FIG. 8 is a flow chart illustrating a method of operation of the power plant controller of FIG. 4.

One mode of operation of a dynamic ramp rate controller comprising the modules of FIGS. 6 and 7 is illustrated in FIG. 8. It is envisaged that the method 800 shown in FIG. 8 is performed continuously, and that the output ramp rate is used as part of the control signal when triggered by a triggering condition. As will be appreciated, in the present examples the triggering condition is the end of the post-fault state, but may also depend on voltage levels recovering and staying within normal operational levels for a period of time, and/or may be based on a measurement of the stability of voltage levels.

In FIG. 8, the main Q controller 206 and additional Q controller 406 are operated 802, 804 in parallel to output the reactive power reference level and the target reactive power level.

The outputs of each of the controllers 206, 406 is received 806 at the ramp rate logic. The difference calculator 448 of the ramp rate logic calculates 808 a difference between the reference and target levels. A ramp rate is calculated 810 based on the difference by the ramp rate calculator 452.

The ramp rate calculator 452 also applies 812 any limiting conditions to update the ramp rate. The updated ramp rate is output 814 from the ramp rate logic and the dynamic ramp rate controller 402, ready for use in signal conditioning and dispatch.

Figure 9:
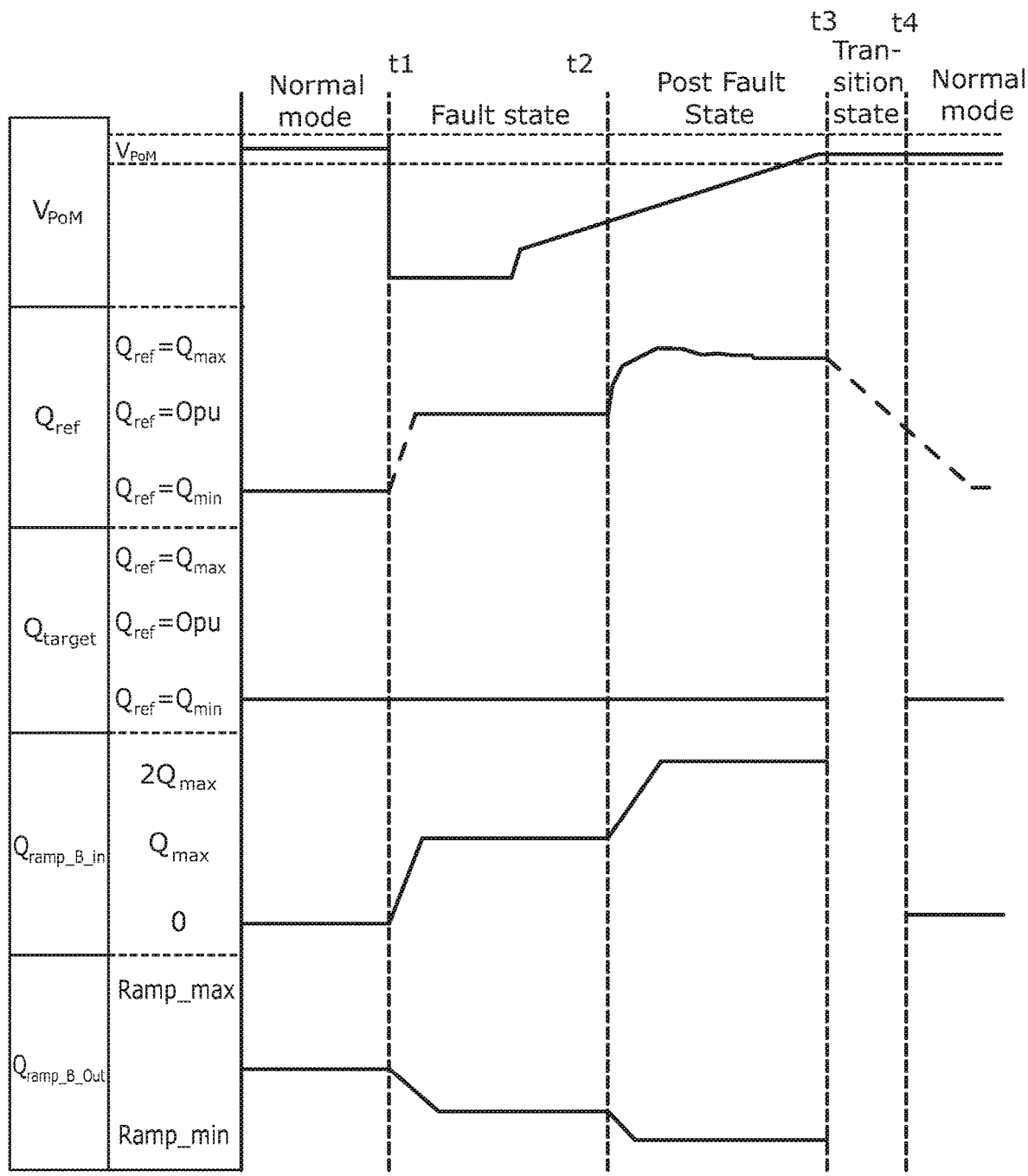
FIG. 9 is a representation demonstrating voltage levels in an example fault scenario, and the response of the power plant controller of FIG. 4.
Figure 10:
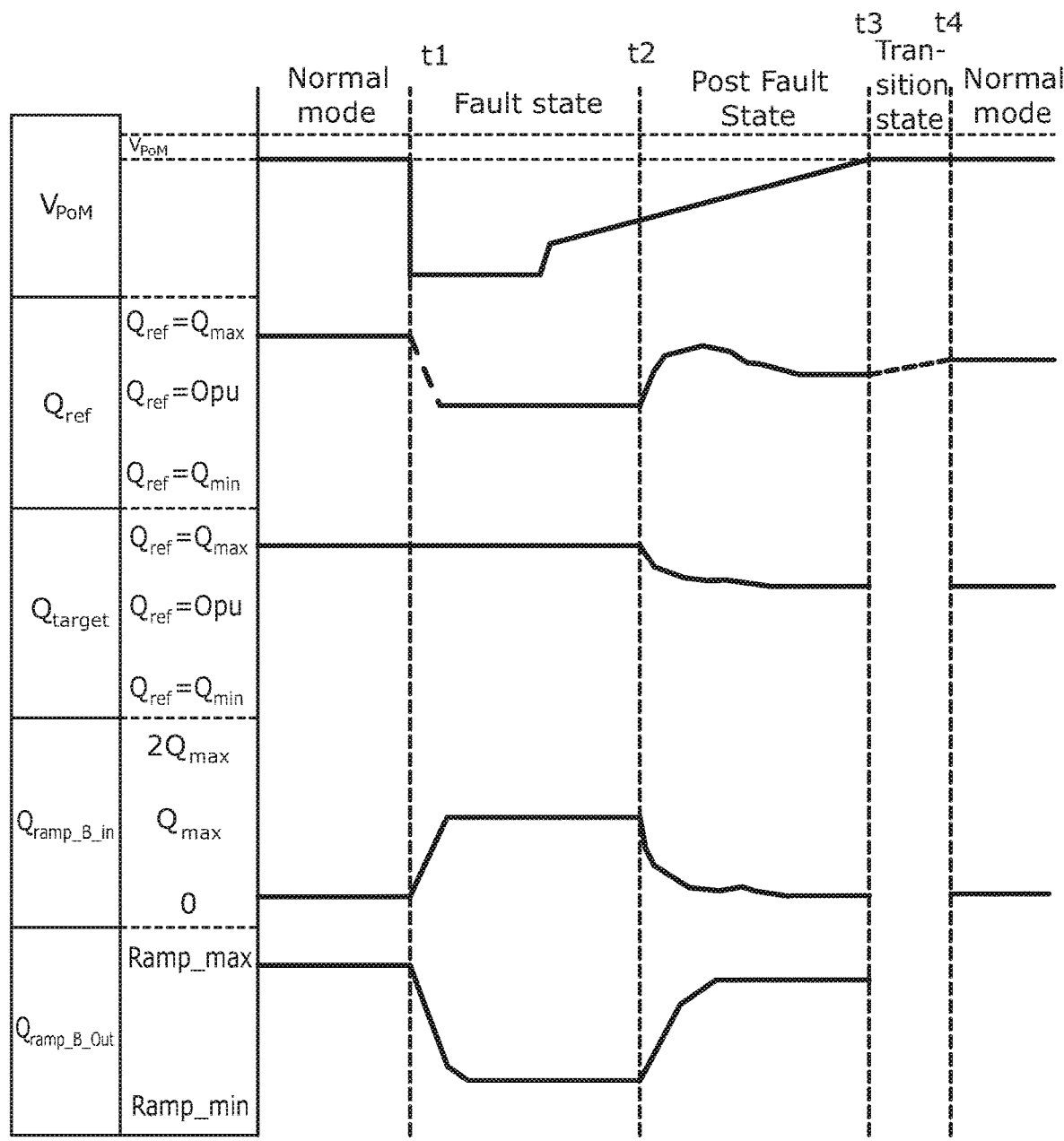
FIG. 10 is a representation demonstrating voltage levels in another example fault scenario, and the response of the power plant controller of FIG. 4.

FIGS. 9 and 10 illustrate the response of parameters used by a Q controller 206 and by a dynamic ramp rate controller 402 incorporating an additional Q controller 406 in response to different operation scenarios. FIG. 9 illustrates the response when the normal operational mode is a reactive power or power factor control mode, while FIG. 10 illustrates the response when the normal operational mode is voltage control mode.

In each of FIGS. 9 and 10, five charts are shown, each illustrating a different parameter's changes over time. The charts respectively show: the voltage measured at the PoM, $V_{poM}$; the reactive power reference level, $Q_{ref}$; the target reactive power level, $Q_{target}$; the output of the difference calculator, $Q_{ramp\_in}$; and the output of the ramp rate calculator, $Q_{ramp\_out}$.

In FIG. 9, the operation of the system in its normal power factor/reactive power control mode is illustrated initially. $V_{poM}$ is measured as being within its normal operational bounds. Because $V_{poM}$ is in its normal bounds, and the WPP 12 and PPC 32 are operating in a reactive power/power factor control mode, both $Q_{ref}$ and $Q_{target}$ are at the minimum reactive power value, $Q_{min}$, i.e. maximum reactive power consumption by the WPP 12. In normal operation, $Q_{ref}$ and $Q_{target}$ are equal. This is because both the main and additional Q controllers 206, 406 are operating in the same mode—no fault ride-through has been initiated. $Q_{ramp\_in}$, which is the difference between $Q_{ref}$ and $Q_{target}$ is zero because $Q_{ref}$ and $Q_{target}$ are the same value. Therefore, the ramp rate calculator 452 is calculating $Q_{ramp\_out}$ to be at a default level.

At t1, the fault occurs, and the voltage deviates out from its normal operational bounds. The main Q controller 206 receives an input from its fault ride-through input 224 to enter the fault state. The additional Q controller 406 does not receive this input. Therefore, $Q_{ref}$ changes from $Q_{min}$ to unitary power factor at 0 p.u., while $Q_{target}$ is maintained at $Q_{min}$. As a result, a difference now exists, equal to $Q_{max}$ and this results in a reduction in the ramp rate to account for the difference in ramp rates.

At t2, the voltage has recovered to permit the post-fault state to begin, and for control of the WTGs 14 to be regained by the PPC 32. The post-fault state requires reactive power injection by the WPP 12 to the main grid 16, so $Q_{ref}$ rises to a maximum level of reactive power supply, $Q_{max}$. As it is still operating in its normal operational mode, the additional Q controller 406 maintains $Q_{target}$ at $Q_{min}$. The difference is now equal to $2Q_{max}$. This is the maximum difference, and the ramp rate calculator 452 reacts accordingly to lower the ramp rate to the lowest possible value, $\text{Ramp}_{min}$.

At t3, the voltage has recovered to normal operational levels and the transition state can be entered. The ramp rate, $Q_{ramp\_out}$, is used for the transition from the $Q_{ref}$ value to the $Q_{target}$ value. As the ramp rate is at its minimum level, the length of the transition state is increased from its default level.

Once the transition is complete, normal operation is resumed.

In FIG. 10, $V_{PoM}$ is close to its lower bound during normal operation. The WPP 12 and PPC 32 are operating in voltage control mode, where reactive power supplied to the grid by the WPP 12 is at its maximum level, $Q_{max}$. As a result, both $Q_{ref}$ and $Q_{target}$ are at $Q_{max}$, and so the difference is zero. The default ramp rate for this scenario is the maximum ramp rate to ensure a fast transition.

At t1, the fault occurs, and $V_{PoM}$ drops to a low level. The main Q controller 206 enters its fault state, and so $Q_{ref}$ is 0 p.u. $Q_{target}$ is maintained at $Q_{max}$, so the difference is $Q_{max}$. The large difference causes the ramp rate to decrease.

When the post-fault state is entered after the fault state, at t2, $Q_{ref}$ is changed to a post-fault level, which in FIG. 10 is slightly below $Q_{max}$. The post-fault level is slightly below $Q_{max}$ because it is dependent on the voltage level. It will be appreciated that the post-fault reactive power level is set according to the control protocol of the turbine. As the post-fault state is a voltage control state, the reactive power set points for voltages between $V_{LVRT\_OUT}$, where the post-fault state is entered, and the normal operational voltage level are similar in both the additional and main Q controllers, as both operating in a form of voltage control state. Therefore, both $Q_{ref}$ and $Q_{target}$ align at the same or a similar value, and the difference becomes zero or close to zero. As a result, the ramp rate is returned to close to its maximum, because the required transition distance between $Q_{ref}$ and $Q_{target}$ is very small. Therefore, the transition state time is small.

It will be appreciated that the above description of the dynamic ramp rate controller is one way of implementing a dynamic ramp rate according to the methods described herein. In alternative examples, a memory unit is incorporated into the PPC that stores a value of $Q_{ref}$ prior to the fault for use as $Q_{target}$ after the post-fault state. In other examples, a memory unit storing values for $Q_{target}$ and/or ramp rates is used.

In some embodiments, alternative renewable energy generators or a hybrid power plant may be operated according to the methods described herein.

Many modifications may be made to the above examples without departing from the scope of the present invention as defined in the accompanying claims.

The invention claimed is:

1. A method for operating a renewable energy power plant comprising a plurality of renewable energy generators, the method comprising:
   operating a first reactive power controller to output a present reactive power reference level, the first reactive power controller configured to operate in a fault ride-through mode during a grid fault;
   operating a second reactive power controller to output a target reactive power reference level, the second reactive power controller configured to operate following the grid fault in a normal operational mode as if the grid fault had not occurred;
   calculating a rate of change of reactive power reference level for transitioning between the present reactive power reference level, and the target reactive power reference level, the target reactive power reference level being suitable for normal operation of the renewable energy power plant; and
   following a fault on a power network to which the renewable energy power plant is connected, dispatching a control signal for controlling the renewable energy power plant to generate or consume reactive power at the calculated rate of change to transition a reactive power level of the renewable energy power plant to the target reactive power reference level.

2. The method of claim 1, comprising generating a difference between the present reactive power reference level and the target reactive power reference level, and wherein the rate of change of reactive power reference level is calculated based on the generated difference.

3. The method of claim 2, wherein the rate of change of reactive power reference level is indirectly proportional to the generated difference.

4. The method of claim 1, wherein the rate of change of reactive power reference level for transition is calculated based, at least in part, on a short-circuit ratio of the power network.

5. The method of claim 1, wherein the target reactive power reference level is a reactive power reference level generated prior to the fault.

6. The method of claim 5, wherein the target reactive power reference level is a reactive power reference level generated most recently prior to the fault.

7. The method of claim 1, wherein the rate of change of reactive power reference level for transition is calculated based, at least in part, on a voltage level.

8. A power plant controller for controlling operation of a renewable energy power plant comprising a plurality of renewable energy generators and connected to a power network, the power plant controller comprising:
   a main reactive power controller configured to generate a reactive power reference level, wherein the main reactive power controller operates in a fault ride-through mode during a grid fault; and
   a dynamic ramp rate controller comprising an additional reactive power controller that generates a target reactive power reference level, wherein the additional reactive power controller operates following the grid fault in a normal operational mode as if the grid fault had not occurred, and wherein the dynamic ramp rate controller is configured to calculate a rate of change of reactive power reference level for transitioning between the reactive power reference level generated by the main reactive power controller and the target reactive power reference level, the target reactive power reference level being suitable for normal operation of the renewable energy power plant.

9. The power plant controller of claim 8, wherein the dynamic ramp rate controller comprises ramp rate logic configured to calculate the rate of change of reactive power reference level for transition based, at least in part, on a difference between the reactive power reference level and target reactive power reference levels.

10. A computer program downloadable from a communication network or stored on a machine readable medium, comprising program code instructions for implementing an operation of a renewable energy power plant comprising a plurality of renewable energy generators, the operation comprising:
   operating a first reactive power controller to output a present reactive power reference level, the first reactive power controller configured to operate in a fault ride-through mode during a grid fault;

operating a second reactive power controller to output a target reactive power reference level, the second reactive power controller configured to operate following the grid fault in a normal operational mode as if the grid fault had not occurred;

calculating a rate of change of reactive power reference level for transitioning between the present reactive power reference level and the target reactive power reference level, the target reactive power reference level being suitable for normal operation of the renewable energy power plant; and following a fault on a power network to which the renewable energy power plant is connected, dispatching a control signal for controlling the renewable energy power plant to generate or consume reactive power at the calculated rate of change to transition a reactive power level of the renewable energy power plant to the target reactive power reference level.

11. The computer program of claim 10, comprising generating a difference between the present reactive power reference level and the target reactive power reference level, and wherein the rate of change of reactive power reference level is calculated based on the generated difference.

12. The computer program of claim 11, wherein the rate of change of reactive power reference level is indirectly proportional to the generated difference.

13. The computer program of claim 10, the target reactive power reference level being a reactive power reference level generated based on normal operational conditions of the renewable energy power plant.

* * * * *